(No Model.)
C. D. TOWNSEND.
CONVERTIBLE WAGON JACK OR SHAFT HOLDER.
No. 420,478. Patented Feb. 4, 1890.
Fig. II.
Fig. I.
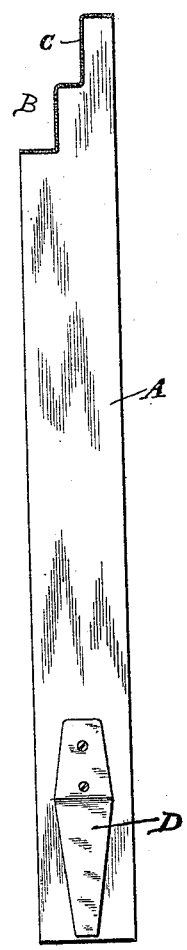
Witnesses
Lillie Hunnur
F. W. Crocker
Inventor
Charles D. Townsend
By Frederick W. Crocker
Att'y.

UNITED STATES PATENT OFFICE.

CHARLES D. TOWNSEND, OF WINDHAM, NEW YORK.

CONVERTIBLE WAGON-JACK OR SHAFT-HOLDER.

SPECIFICATION forming part of Letters Patent No. 420,478, dated February 4, 1890.

Application filed October 28, 1889. Serial No. 328,461. (No model.)

*To all whom it may concern:*

Be it known that I, CHARLES D. TOWNSEND, a citizen of the United States, residing in the town of Windham, county of Greene, State of New York, have invented a new and useful Improved Convertible Wagon-Jack or Shaft-Holder, of which the following is a specification, reference being had to the accompanying drawings, in which—

Figure I is an elevated side view showing my invention. Fig. II is an edge view thereof.

The object of my invention is to construct a new article of manufacture, a convertible wagon-jack or shaft-holder; and it consists of a standard or body of rectangular form, provided at its upper end with a series of right angles or steps cut therein and near its lower end with a set-up hook, point downward, attached to one of the side faces thereof.

A is the rectangular standard or body, provided at its top with a series of right angles or steps B, which can be cut in any number or at any height desired. The steps are covered with felt C or other suitable material to prevent the scratching or removing of the paint or in any way defacing the finished surface of the axle with which it comes in contact.

D is a spring-hook attached near the bottom of standard or body A, point downward, and sufficiently set up at an angle thereto to permit the axle to pass between it and standard A. The hook D and that portion of the standard or body A beneath it is covered with rubber E or analogous elastic material to increase the binding force and also to prevent defacing or marring that portion of the vehicle with which it comes in contact.

The manner of using my invention is as follows: When it is desired to remove a wheel for oiling or other purposes, the standard or body A is placed beside the axle and the axle raised and placed thereon in one of the angles. When it is used to hold up the shafts in a buggy, the standard or body A is run under the cross-piece of the shafts, hook end downward, and the hook passed over the axle, which, owing to its rubber facing, binds thereon and holds the shafts firmly up at an angle out of the way, preventing them from becoming broken by being stepped on by horses or run over by vehicles coming in and going out of the carriage-house.

What I claim as my invention, and desire to secure by Letters Patent, is—

As a new article of manufacture, a convertible jack or shaft-supporter consisting of a standard or body A, provided at its top with a series of right angles or steps B, covered with felt C, and at or near its other end a set-up hook D, point downward, covered, and that portion of standard or body A beneath it, with rubber E or analogous material, substantially as shown and described.

CHAS. D. TOWNSEND.

Witnesses:
ADDISON P. ROACH,
BENJ. I. TALLMADGE.